Figure 1:
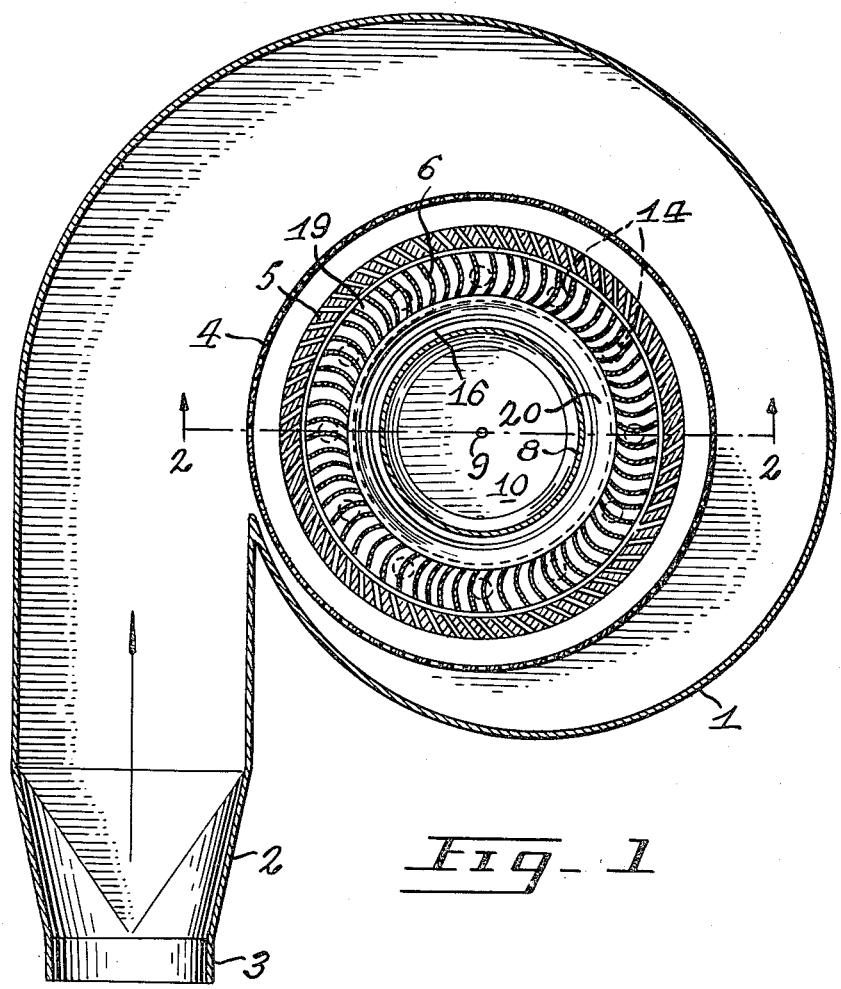

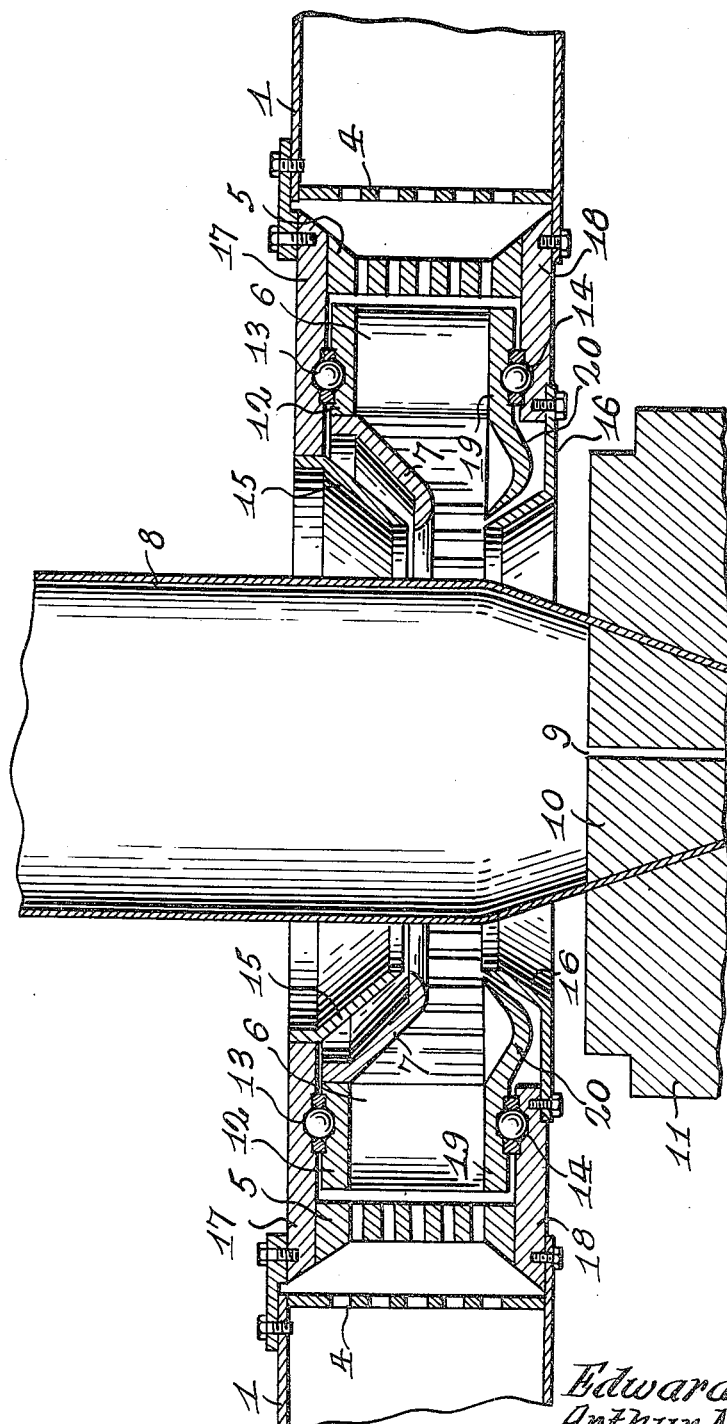

United States Patent Office 2,770,009
Patented Nov. 13, 1956

2,770,009
TUBE COOLING BLOWER

Edward H. Rogal and Arthur Martynse, Shawinigan Falls, Quebec, Canada, assignors to Du Pont Company of Canada Limited, Montreal, Quebec, Canada, a corporation of Canada Application February 3, 1955, Serial No. 485,967

Claims priority, application Canada December 15, 1954

4 Claims. (Cl. 18—14)

This invention relates to the manufacture of film and tubing by the inflated tube extrusion method. More particularly it relates to a new and improved method and apparatus for extruding such film and tubing whereby the wall thickness of the finished product is more uniform and the quality thereof is thus improved.

Thermoplastic materials are commonly formed into uniform tubular shapes by extruding the molten thermoplastic from a die having an annular opening and the resulting tubular shape is inflated by means of a gaseous medium preferably injected through the axial portion of the die. The inflation causes a slight increase in the diameter of the tubing as it issues from the die and instantaneous cooling will fix the diameter at some value slightly greater than the diameter of the annular opening in the die. The instantaneous cooling is achieved generally by directing a stream of air onto the surface of the tubing after it leaves the die. The finished tubing is then collapsed and taken up on rolls as a flattened tube. It is apparent that uneven cooling of the tubing resulting from an uneven flow of air onto the tubing while still in a semi-molten condition will allow parts of the tubing to remain soft and thus stretch as a result of the pressure of inflation. The quality of the finished tubing is thus affected since the wall thickness does not remain constant throughout the circumference of the tubing. The result of this imperfection becomes immediately apparent when the flattened tubing is wound onto the rolls, particularly if the plastic material exhibits cold flow properties, and an uneven roll results. The tubing, when unwound for use, is usually then found to possess an irregular curl and ripples. Further operations become necessary in order to correct this condition before the tubing may be put through such finishing operations as printing, for example.

It is an object of this invention to provide a new method and apparatus whereby tubing and film of uniform thickness and high quality may be produced from thermoplastic materials.

Further objects will become apparent throughout the ensuing description.

According to one embodiment of the invention, a thermoplastic material such as polyethylene, for example, is extruded while in a molten state through a die having an annular opening therein. The resulting tubing is inflated to a predetermined diameter while being allowed to cool and is collapsed and wound onto suitable rollers after the cooling is complete. In order to complete this cooling process as rapidly and evenly as possible a succession of streams of gaseous cooling means, preferably air, is directed upon the outside surface of the tubing after it emerges from the die, the direction of coolant flow being away from the die. The streams are produced within an apparatus which includes a radial flow turbine mechanism. The turbine is caused to rotate by the passage of the coolant through it and produces a continuous rotary motion which is imparted in turn to the coolant as it leaves the turbine flowing towards the extruded tubing, the whole operation resulting in rapid and even cooling of the tubing.

The extrusion and inflation operations may conveniently be carried out with dies commonly employed in extrusion processes and provided with some sort of axial gas inlet to produce the inflatory pressure. The cooling process is carried out at a position as close to the die as is convenient and the coolant is directed at the extruded tubing in a direction away from the die outlet, in order that the tubing will not be cooled immediately after extrusion. The expansion under inflation occurs only while the thermoplastic material is still in a plastic state. After cooling, the tubing becomes dimensionally stable. The resultant tubular shape is conveniently collapsed between a pair of rollers and is taken up on suitable reels for storage or transportation purposes.

The evenness of the cooling will be controlled by both the angular and linear velocity of the coolant as it impinges upon the extruded tubing. In general, both of these will be controlled by the linear velocity alone, since the angular velocity of the streams of coolant is directly dependent upon the linear velocity of the gas as it passes through the turbine. The radial velocity may be conveniently independently controlled by means of a suitable braking device such as a spring loaded friction pad of adjustable tension if such control is desirable.

The operation of the invention will become more clear from the ensuing detailed description of a typical apparatus with reference to the accompanying drawings.

In the drawings, Figure 1 is a transverse section of a typical apparatus embodying the invention. In the drawing, 1 represents a scroll-shaped casing which serves to direct the cooling gases with approximately equal pressures to all inlet points in the turbine mechanism by virtue of its diminishing diameter. The section 3 may be attached to any convenient source of air such as a blower, for example, and 2 is a tapered connection between the inlet and the casing 1. The air under pressure moves in the direction shown by the arrow. The air passes through the perforations in the cylindrical support shown at 4 and into the channels in the nozzle ring 5 which direct successive streams of air upon the concave part of the curved blades 6. After impinging upon the blades 6 the air then passes by the deflector ring indicated at 20 where it is directed upward, relative to the drawing which is assumed to represent a downward-looking view. An inflated tubular section of extruded polyethylene is shown at 8, the inflation being achieved by means of the inlet shown at 9. 10 represents the inner section of an annular die.

Figure 2 is a vertical section through the line B—B of Figure 1. Only a part of the casing is shown at 1, the perforated supporting cylinder is shown at 4, the channelled nozzle ring at 5, the curved turbine blades at 6, the top deflector ring at 7 and the bottom at 20, a section of inflated tubing at 8, the inflating inlet at 9 and the inner section of the annular die at 10. The outer section of the die is shown at 11.

The top and bottom portions of the rotating assembly carrying the blades 6 and the deflecting rings 7 and 20, and shown at 12 and 19 are supported by and allowed to turn between the top runner guide 17 and the bottom runner guide 18. A convenient ball bearing suspension arrangement is shown at 13 for the top and 14 for the bottom. The runner guides 17 and 18 and top and bottom blade supports 12 and 19 are all provided with grooves which cooperate with the ball bearings to support the turbine assembly firmly and permit of substantially frictionless rotation. 15 and 16 are the top and bottom guard rings.

In this drawing, the operation of the assembly is more clearly illustrated. The cooling air is broken up into separate streams of air by the channels in the nozzle ring 5 which streams are then directed against the curved blades 6 of the turbine itself, causing the turbine to rotate on the bearings 13 and 14. After passing through the blades the air streams are directed upwards onto the extruded tube 8 by the curved deflectors 7. In this way the individual streams of air not only cool the tubing as it is extruded but provide a force which may act upon a simple mechanism that effectively causes the streams to move evenly over the whole external surface of the tubing. The angular velocity at which the streams of air rotate may be conveniently controlled by regulating the rate at which air is supplied to the whole apparatus or by providing a simple adjustable brake mechanism attached to one of the runner guides and set to rub against a smooth portion of the turbine assembly. The rate of spin will then be controlled by the amount of friction applied.

The air supply may come from any convenient source although a fan is perhaps the most convenient to use. If some other coolant than air is to be employed, then the source of the coolant will determine the means used to produce the motion required through the apparatus.

The apparatus has found its greatest success with polyethylene resins, since an inherent difficulty with this type of material has been the unevenness resulting from normal cooling methods. The use of the air itself as a motivating force to drive an apparatus which in turn spreads the air most evenly over an inflated polyethylene tube has been found to be convenient and practical, resulting in a finished tubing of uniform wall thickness.

Other thermoplastic materials may be conveniently extruded in this form and the invention or the use thereof is not restricted to tubing of polyethylene thermoplastic. Similarly, although air is a preferred coolant and inflating means by virtue of cost, other desirable means may be used.

Other variations may be made in the carrying out of the invention without departing from the spirit or the scope thereof, and we intend to be limited to the definition as set forth in the claims appended hereto.

Having thus described our invention what we claim is:

1. An apparatus adapted to direct an even stream of gaseous cooling medium upon extruded tubing made of a thermoplastic material as said tubing issues from extrusion apparatus, said apparatus comprising a rotatable radial flow turbine and means to direct a succession of streams of said cooling medium inwardly upon the blades of said turbine.

2. A blowing apparatus adapted to cool extruded thermoplastic tubing by directing an even stream of air upon the tubing as it issues from the extrusion apparatus, said blowing apparatus comprising a rotatable radial flow turbine, intake means to direct successive streams of air inwardly upon said turbine and means for conducting a large stream of air evenly to said intake means.

3. A blowing apparatus adapted to cool extruded thermoplastic tubing by directing an even stream of air upon the tubing as it issues from the extrusion apparatus, said blowing apparatus comprising a rotatable radial flow turbine comprising a succession of transversely mounted airfoil sections and air directing means consisting of two inner-mounted upwardly-curved rings, intake means to direct successive streams of air inwardly upon the concave surface of said airfoil sections and means for conducting a large stream of air evenly to said intake means.

4. In a blowing apparatus adapted to cool extruded thermoplastic tubing as it issues from extrusion means, the combination comprising a rotatable radial flow turbine mounted around said tubing a short distance away from said extrusion means, said turbine comprising top and bottom upwardly curved deflecting plates and a succession of transversely mounted airfoil sections between said deflecting plates, a nozzle ring co-axial with said turbine and surrounding it, said nozzle ring having a succession of radial air directing passages, top and bottom bearing means associated with said nozzle ring and said turbine, and a scroll-shaped casing surrounding said nozzle ring, the open end of said casing being adapted to receive the ingress of large volumes of air in motion.

References Cited in the file of this patent

UNITED STATES PATENTS

| | | |
|---|---|---|
| 2,607,078 | Grimes | Aug. 19, 1952 |
| 2,632,206 | Pierce | Mar. 24, 1953 |